United States Patent
Takafuji et al.

(10) Patent No.: US 7,148,792 B2
(45) Date of Patent: Dec. 12, 2006

(54) VEHICULAR PEDESTRIAN DETERMINING SYSTEM

(75) Inventors: Tetsuya Takafuji, Anjo (JP); Yoshiyuki Hattori, Toyoake (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 10/944,704

(22) Filed: Sep. 21, 2004

(65) Prior Publication Data
US 2005/0096815 A1    May 5, 2005

(30) Foreign Application Priority Data
Oct. 29, 2003    (JP) ............................. 2003-369488

(51) Int. Cl.
B60Q 1/00    (2006.01)
(52) U.S. Cl. .................... 340/436; 340/435
(58) Field of Classification Search ................ 340/435, 340/436, 437, 438, 561, 903; 180/274, 167; 280/734; 307/10.1, 116; 341/33; 324/662, 324/663
See application file for complete search history.

(56) References Cited

U.S. PATENT DOCUMENTS

| | | | | |
|---|---|---|---|---|
| 4,661,797 A | * | 4/1987 | Schmall | ...................... 340/561 |
| 4,672,230 A | * | 6/1987 | Spahn | ......................... 307/116 |
| 5,392,024 A | * | 2/1995 | Kiuchi et al. | ................ 340/436 |
| 6,037,860 A | * | 3/2000 | Zander et al. | .............. 340/436 |
| 6,359,553 B1 | * | 3/2002 | Kopischke | .................. 340/436 |
| 6,560,301 B1 | * | 5/2003 | Cook et al. | ................. 375/350 |
| 6,724,324 B1 | * | 4/2004 | Lambert | ...................... 341/33 |

FOREIGN PATENT DOCUMENTS

| | | |
|---|---|---|
| JP | A-11-28994 | 2/1999 |
| JP | A-2000-326808 | 11/2000 |
| JP | A-2004-256023 | 9/2004 |

\* cited by examiner

*Primary Examiner*—Van T. Trieu
(74) *Attorney, Agent, or Firm*—Posz Law Group, PLC

(57) ABSTRACT

A pedestrian determining system mounted on a vehicle determines a collision object for protecting a pedestrian. An impedance sensor is included for detecting an alternating-current impedance or an electricity quantity being a function value of the alternating-current impedance to thereby output the detected one as an impedance signal, wherein the alternating-current impedance is varied by approaching of the collision object. A collision load sensor is included for detecting a collision load when the collision object collides with the vehicle to output the detected collision load as a collision load signal. Whether the collision object is a pedestrian or not is determined based on a value of a given function including as input variables the impedance signal outputted from the impedance sensor and the collision load signal outputted from the collision load sensor.

16 Claims, 8 Drawing Sheets

VEHICULAR PEDESTRIAN DETERMINING SYSTEM

CROSS REFERENCE TO RELATED APPLICATIONS

This application is based on and incorporates herein by reference Japanese Patent Application No. 2003-369488 filed on Oct. 29, 2003.

FIELD OF THE INVENTION

The present invention relates to a vehicular pedestrian determining system or collision object determining system that detects or determines an object that collides with a bumper of a vehicle for protecting a pedestrian.

BACKGROUND OF THE INVENTION

When a pedestrian collides with a vehicle, a head or the like of the pedestrian collides with a hood or windshield of the vehicle. This results in serious injury. In particular, since a substantial member such as an engine existing under the hood may bring about a large injury, an invention of lifting the hood or a technology of disposing an airbag on the hood is proposed for protecting the pedestrian or decreasing the injury.

However, these mechanisms protecting the pedestrian should not be always operated, so that it is expected that these mechanisms be operated only when a collision object is determined to be a pedestrian. For instance, in adopting these mechanisms, various adverse influences result from operating a protecting device on the hood (e.g., active hood) when a collision object is not a pedestrian. When a light object that collides with a vehicle, such as a triangle corn or a signboard indicating road construction, cannot be discriminated from a pedestrian, the protecting device is uselessly operated. This involves useless repair costs. Further, by contrast, when a heavy stationary object that collides with a vehicle, such as a concrete wall or another vehicle, cannot be discriminated from a pedestrian, a problem occurs that the hood being lifted is backed into an interior of the vehicle, harming an occupant of the vehicle.

Accurately determining whether a collision object is a pedestrian is thereby more required than before, so that several methods for determining the collision object are proposed. For instance, Patent document 1 proposes a collision object determining technology using an electrostatic capacitance. Here, a difference in electrostatic capacitance is electrically detected between a pedestrian and a collision object that is a conducting member (including a resistance member in this specification), based on variations of electrostatic capacitance between the collision object and an electrode plate of an electrostatic capacitance sensor. Patent document 2 proposes a technology using a load sensor (or collision load sensor) that detects impact. Here, a kind of the collision object is determined based on variations of a collision load waveform that is detected by the load sensor.

(Patent document 1: JP-2000-326808 A)

(Patent document 2 JP-H11-028994 A)

The collision object determining technology using an electrostatic capacitance has an advantage in detecting a pedestrian before a collision to thereby enable a sufficient period for dealing with the collision. However, this technology has a disadvantage. Namely, a difference in the electrostatic capacitance between a pedestrian (human body) and a metal member is small; further, inclination in the sensor output has the same direction. Discriminating a person from metal thereby sometimes becomes difficult, depending on kinds or shapes of the metal. Further, to detect the electrostatic capacitance between a pedestrian and an electrode plate disposed in the vehicle, the capacitance is varied based on a positional relationship between the pedestrian and electrode plate in a vehicle-width direction (or in a side to side direction of the vehicle). Accurately determining that a pedestrian actually collides with the vehicle is thereby not easy, so that a problem occurs that the pedestrian protecting device starts to operate even when no pedestrian collides with the vehicle. For instance, even when a person touches a bumper or passes very close to the bumper, the collision with the pedestrian is mistakenly determined to thereby cause the pedestrian protecting device to operate.

Next, the technology using the collision load sensor has an advantage in accurately detecting a collision, but has a disadvantage in needing a quick response for dealing with the collision since the collision is detected after the collision actually occurs. Further, the collision load sensor is difficult to discriminate a person from a collision object having a mass, rigidity, and a friction coefficient with a road, that resemble those of a person. A problem thereby occurs that it is difficult to discriminate a person from a signboard or fence that has a weight resembling that of a person.

Namely, each of the pedestrian determining technology using the electrostatic capacitance and the pedestrian determining technology using the collision load sensor has the disadvantage in decreasing accuracy in determining the collision object.

SUMMARY OF THE INVENTION

It is therefore an object of the present invention to provide a vehicular pedestrian determining system that has, in determining a pedestrian, accuracy higher than that of a conventional method.

To achieve the above object, a pedestrian determining system that is mounted on a vehicle and determines a collision object for protecting a pedestrian is provided with the following. An impedance sensor is included for detecting one of an alternating-current impedance and an electricity quantity being a function value of the alternating-current impedance to thereby output the detected one as an impedance signal, wherein the alternating-current impedance is varied by approaching of the collision object. A collision load sensor is included for detecting a collision load when the collision object collides with the vehicle to output the detected collision load as a collision load signal. A controller is included for determining whether the collision object is the pedestrian or not, using the impedance signal outputted from the impedance sensor and the collision load signal outputted from the collision load sensor, so as to control a pedestrian protecting device. Here, at least when the impedance signal exhibits one of a waveform that corresponds to the pedestrian and a signal value that corresponds to the pedestrian, within a given period starting from when the impedance signal crosses a given signal value in a direction in which the collision object approaches the vehicle, the collision object is determined to be the pedestrian and the pedestrian protecting device is controlled for being activated. By contrast, at least when the impedance signal does not exhibit the one of the waveform and the signal value, the collision object is determined to be not the pedestrian and the pedestrian protecting device is controlled for being not activated.

Namely, this vehicular pedestrian determining system utilizes both an impedance sensor that detects a pedestrian approaching without contacting with the pedestrian and a collision load sensor that detects a collision load when the collision occurs. The alternating-current impedance sensor detects variations in the alternating-current impedance (inductance, capacitance, resistance (eddy current loss)) due to a pedestrian approaching or contacting with a vehicle. By contrast, the collision load sensor detects variations in the collision load after when the collision occurs. The impedance sensor can include not only a known electrostatic capacitance sensor, but also a coil sensor or LC sensor. The collision load sensor can include not only a simple ON-OFF switch that turns on because of a collision, but also a sensor that detects a collision load as analog or digital quantities. The latter sensor includes an acceleration sensor and a pressure-resistance sensor where an electric resistance varies depending on a pressure.

For instance, only when a collision sensor detects a collision within a given period starting from when an impedance sensor detects a pedestrian approaching, a pedestrian protecting device is operated. Accordingly, even when a collision load sensor is activated without an impedance sensor detecting a pedestrian approaching, a pedestrian protecting device is not operated. By contrast, when a collision load sensor is not activated within a given period starting from when an impedance sensor detects a pedestrian approaching, a pedestrian protecting device is not operated.

In another aspect of this invention, a pedestrian determining system that is mounted on a vehicle and determines a collision object for protecting a pedestrian is provided with the following. An impedance sensor is included for detecting one of an alternating-current impedance and an electricity quantity being a function value of the alternating-current impedance to thereby output the detected one as an impedance signal, wherein the alternating-current impedance is varied by approaching of the collision object. A collision load sensor is included for detecting a collision load when the collision object collides with the vehicle to output the detected collision load as a collision load signal. A controller is included for determining whether the collision object is the pedestrian or not at least based on a value of a given function including as input variables the impedance signal outputted from the impedance sensor and the collision load signal outputted from the collision load sensor.

This vehicular pedestrian determining system also utilizes both an impedance sensor that detects a pedestrian approaching without contacting with the pedestrian and a collision load sensor that detects a collision load when the collision occurs. The system determines whether a collision object is a pedestrian or not based on a given function that includes as input variables an impedance signal and collision load signal when a collision is detected by the collision load signal. Pedestrian determining can be performed based on combination of relationships in inherent waveforms of the impedance signal and collision load signal just after a pedestrian collides. In a conventional method, the pedestrian determining is performed by using only one of the collision load signal and the impedance signal. Alternatively, a final pedestrian determining is completed by a logical sum or logical multiplication of the pedestrian determining using the collision load signal and pedestrian determining using the impedance signal. Compared with the foregoing, this embodiment can enhance the accuracy in determining whether a collision object is a pedestrian or not.

BRIEF DESCRIPTION OF THE DRAWINGS

The above and other objects, features, and advantages of the present invention will become more apparent from the following detailed description made with reference to the accompanying drawings. In the drawings.

Figure 1:
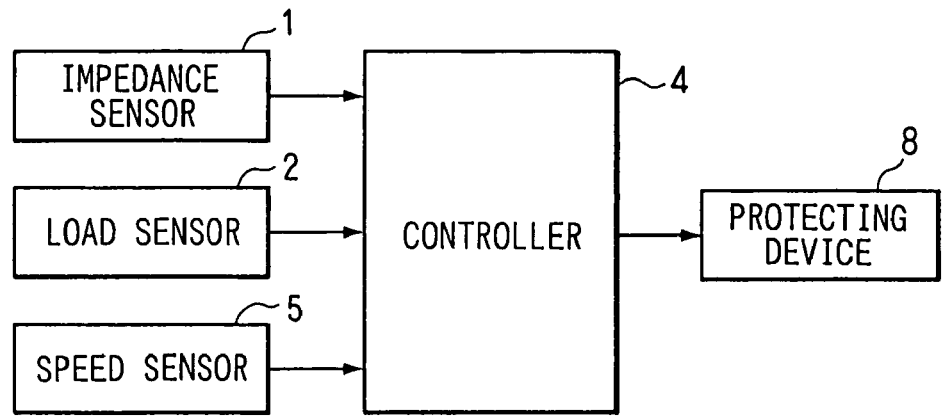
FIG. 1 is a block diagram showing a vehicular pedestrian determining system according to a first embodiment of the present invention.
Figure 2:
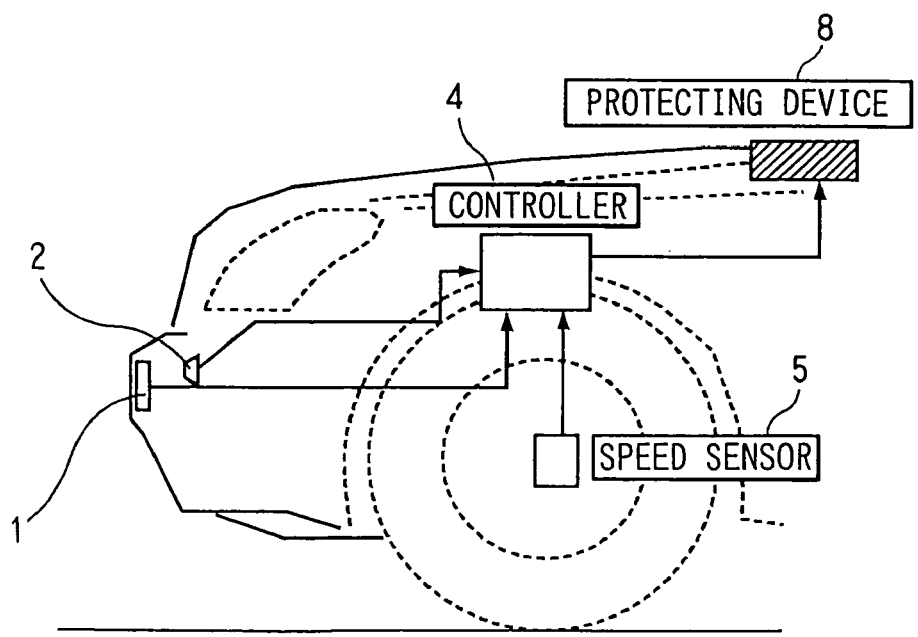
FIG. 2 is a schematic side view showing layout of sensors according to the first embodiment.

DETAILED DESCRIPTION OF THE PREFERRED EMBODIMENTS (First Embodiment)

A structure of a vehicular pedestrian determining system on a vehicle according to a first embodiment of the present invention will be explained with reference to FIGS. 1, 2, 3A to 3D. The vehicle includes an impedance sensor 1, a collision load sensor 2, a bumper cover 13, a bumper absorber 3, a bumper reinforcement 7, a side member 9, a controller 4 for computing and determining, a wheel speed sensor 5 as a vehicle speed sensor, a pedestrian protecting device 8 (pedestrian-protecting airbag), and a vehicle body 6. Here, the bumper cover 13, the bumper absorber 3, and the bumper reinforcement 7 mainly constitute a bumper of the vehicle.

Figure 4:
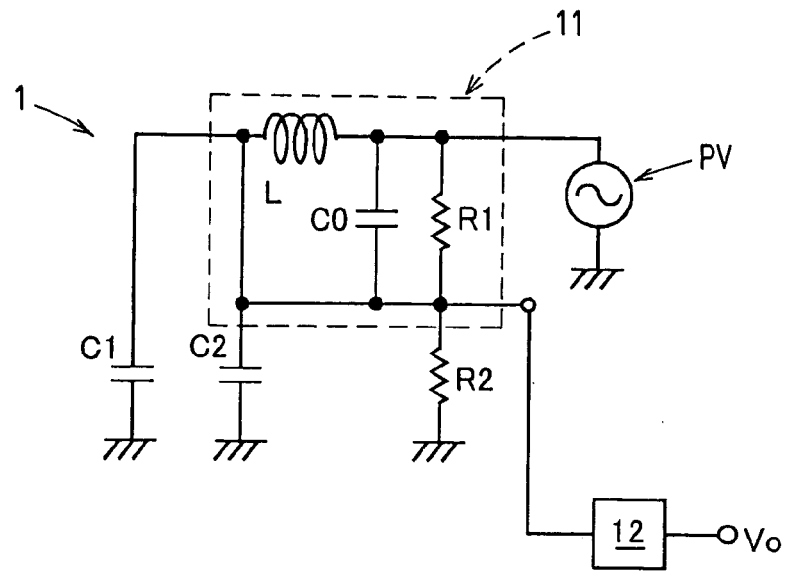
FIG. 4 is a circuit diagram of an impedance sensor according to the first embodiment.

The impedance sensor 1 will be explained with reference to FIG. 4. The impedance sensor 1 includes a coil L fixed on the bumper absorber 3; an LCR circuit 11 formed of a capacitor C0 parallelly connected with both the coil L and a resistance R1; a resistance R2 serially connected with the LCR circuit 11 for detecting an electric voltage drop; and a circuit 12. On one end of the LCR circuit 11, constant voltage is applied from an alternating-current power PV of 300 kHz. The other end of the LCR circuit 11 is connected with one end of the resistance R2 to form an output terminal, while the other end of the resistance R2 is grounded. Capacitors C1, C2 are distribution capacitances of the coil L and inherently exist within between turns of the coil L; however, these distribution capacitances are equivalently described as the capacitors C1, C2 being floating electrostatic capacitances between the both ends of the coil L and the ground. The voltage drop in the resistance R2 is rectified and smoothed by the circuit 12 to be thereby inputted to a micro-computer (not shown) built in the controller 4. A frequency of the alternating-current power PV is a resonance frequency fr between the coil L and the capacitor C0; however, the frequency is not necessarily the resonance frequency fr.

An operation of the impedance sensor 1 will be explained below. When a metal member approaches the coil L, the inductance of the coil L decreases because of influence of eddy current induced in the metal member. The eddy current equivalently corresponds to decrease in resistance parallelly connected with the coil L. When the metal member approaches the coil L, the impedance of the LCR circuit 11 eventually decreases. By contrast, when a human body or insulating member approaches the coil L, the impedance of the LCR circuit 11 hardly decreases. Hence, approaching of a metal member is detected as an increase in an output voltage Vo because of a decrease in impedance of the LCR circuit 11.

Further, since a pedestrian or a metal member that approaches the coil L is recognized as being grounded to the earth in alternating current or direct current, floating capacitance between the coil L and the ground increases. As shown in FIG. 4, this floating capacitance can be equivalent to the capacitors C1, C2 that connect the both ends of the coil L and the ground, so that a synthetic impedance formed of the resistance R2 and capacitor C2 decreases. Here, when the metal member approaches the coil L, the decrease in the synthetic impedance of the resistance R2 and capacitor C2 is much smaller than the decrease in the synthetic impedance of the LCR circuit 11. The output voltage Vo thereby increases. By contrast, when the pedestrian approaches the coil L, the output voltage Vo decreases because of the decrease in the synthetic impedance formed of the resistance R2 and the capacitor C2 without decrease in the synthetic voltage of the LCR circuit 11. As a result, according to this impedance sensor 1, approaching of the metal member or approaching of the pedestrian can be properly discriminated from each other by the increase or the decrease in the output voltage Vo, respectively.

Further, as explained above, the alternating-current impedance decrease of the coil L in approaching of the human body is much smaller than that of the metal member. However, electrostatic capacitance C of the alternating-current impedance circuit to the human body is relatively large because of a large superficial dimension of the human body. This electrostatic capacitance is regarded as equivalently existing between the both ends of the alternating-current impedance circuit and the ground. Here, the electrostatic capacitance C in the one end of the circuit where the alternating-current power is charged can be neglected since the alternating-current power is charged. By contrast, in the other end of the circuit, the electrostatic capacitance C interconnecting both the ground and the connecting point, which is located between the alternating-current impedance circuit and the impedance element for detecting an electricity quantity, is thereby increased. As a result, the voltage drop in the resistance R2 is decreased. Approaching of the human body to the alternating-current impedance circuit is eventually detected by the voltage drop of the impedance element for detecting the electricity quantity.

As explained above, when the collision object is determined to be the metal member, the pedestrian protecting device can be prevented from operating. Further, when the insulating member approaches the coil L, the pedestrian protecting device can be prevented from operating because of no variation in the output voltage Vo.

Figure 5A:
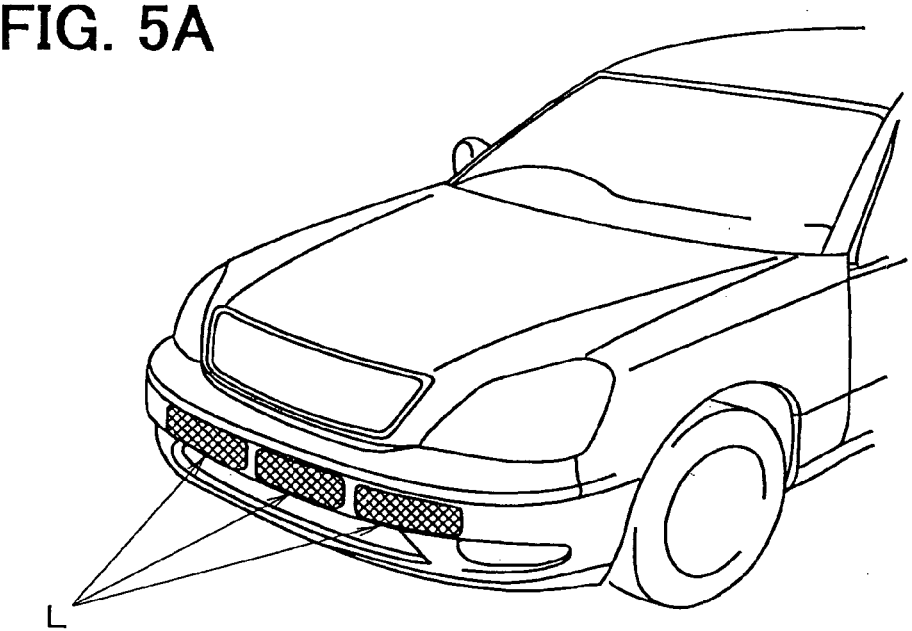
FIG. 5A is a schematic perspective view showing layout of an impedance sensor according to the first embodiment.
Figure 5B:
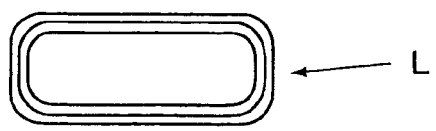
FIG. 5B is a schematic view showing a coil from forward of a vehicle according to the first embodiment.

A preferred disposition of the impedance sensor 1 is shown in FIG. 5A. In FIG. 5A, three coils L are serially disposed in a vehicle-width direction (or horizontal direction) of the bumper absorber 3. Each of the coils L includes an independent LCR circuit 11 that also includes an independent resistance R2 for detecting a voltage drop. Each voltage drops of the resistances R2 is converted into an analog direct-current voltage via an independent circuit 12 to input it to the micro-computer. Namely, the multiple (three in this embodiment) impedance circuit units constituting the impedance sensor 1 are sequentially disposed in a vehicle-width direction, inputting to the micro-computer the respective output voltages. When an object approaches the multiple impedance circuit units, the impedance circuit unit that is closest to the object exhibits the largest variation in the output voltage. The micro-computer selects, from among the multiple output voltages, this output voltage exhibited by the impedance circuit unit closest to the object as the output voltage of the impedance sensor 1. Further, the axes of the coils L of the impedance sensor 1 are disposed in a forward-rearward direction of the vehicle. This increases sensitivity of the coils L with respect to an object that approaches the vehicle from forward of the vehicle. To properly increase the sensitivity of the impedance sensor 1, it is preferable that the impedance sensor 1 be disposed on the front surface or rear surface of the bumper cover 13. In particular, disposing the impedance sensor 1 in the rear surface of the bumper cover 13 removes the necessity of paying attention to the design of the bumper cover 13, so that it is more preferable.

Further, it is considered that detection of a pedestrian is performed by a capacitance increase of the capacitor C1 of the impedance sensor 1. Therefore, it is preferable that a large-dimensional metal plate connected with the connecting portion between the coil L and the resistance R2. Here, the metal plate should be disposed approximately perpendicularly to a forward-rearward direction of the vehicle.

Figure 3A:
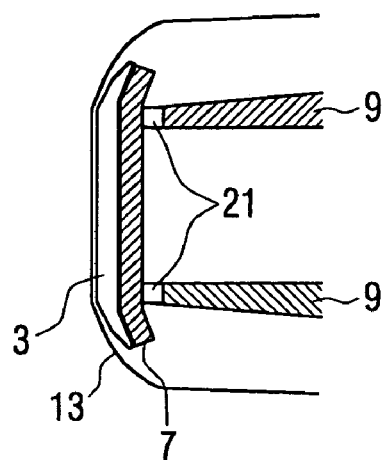
FIGS. 3A to 3D are schematic plan views showing examples of a collision load sensor according to the first embodiment.
Figure 3B:
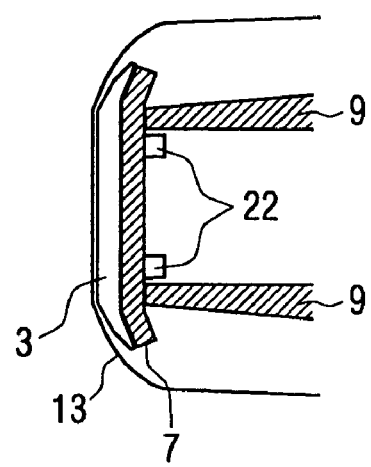
Figure 3C:
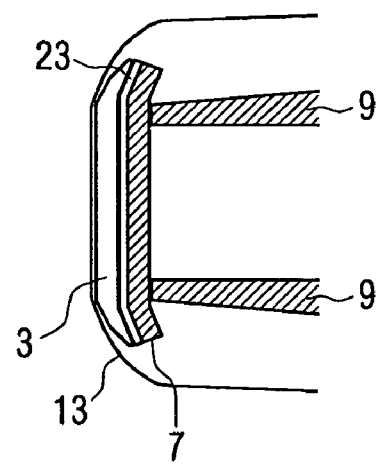
Figure 3D:
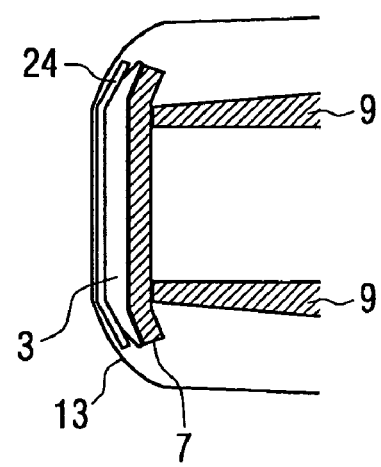

The collision load sensor 2 is disposed in a forward portion within the vehicle body 6 for detecting a pedestrian collision load. Various structures shown in FIGS. 3A to 3D can be selectable. Namely, the collision load sensor 2 can include as follows: a load sensor 21 that is disposed between a bumper reinforcement 7 and a side member 9 (in FIG. 3A); an acceleration sensor 22 that is disposed on a rear surface of a bumper reinforcement 7 (FIG. 3B); a thin-film-type surface-pressure sensor 23 that is disposed between a bumper absorber 3 and a bumper reinforcement 7 (FIG. 3C); and a deformation sensor 24 that is disposed on a bumper absorber 3 (FIG. 3D). The thin-film-type surface-pressure sensor 23 is disposed in a vehicle-width direction along the front surface of a bumper reinforcement 7 for detecting a collision load since an electric resistance is varied depending on an applied pressure. For instance, the thin-film-type surface-pressure sensor 23 is constructed of a pair of electrode lines that are disposed in a vehicle-width direction with a given gap therebetween, and a carbon-containing rubber film that is disposed between the pair of the electrode lines. When a collision load is applied to the rubber film, the rubber film is compressed in a forward-backward direction of the vehicle. An electric resistance of the rubber film is thereby decreased in the forward-backward direction (film's thickness direction). The collision load is eventually detected by detecting the electric resistance between the two electrode lines. Further, known various dynamic sensors that output electricity quantities according to the collision load applied to the bumper absorber 3 can be naturally adopted as the collision load sensor 2.

The collision load sensor 2 outputs voltage based on (preferably, in proportion to) a collision load when a collision occurs. The output voltage is sent to the micro-computer built in the controller 4.

The controller 4 includes an A/D converter and the micro-computer. The A/D converter converts outputs from a resonance circuit sensor (impedance sensor) 1 or the collision load sensor 2 into digital signals. The micro-computer processes the digital signals to detect a collision of a pedestrian, and instructs the pedestrian protecting device 8 to operate. The structures of the controller 4 and wheel speed sensor 5 are conventionally known, so that the explanation of them is removed herein.

Figure 6:
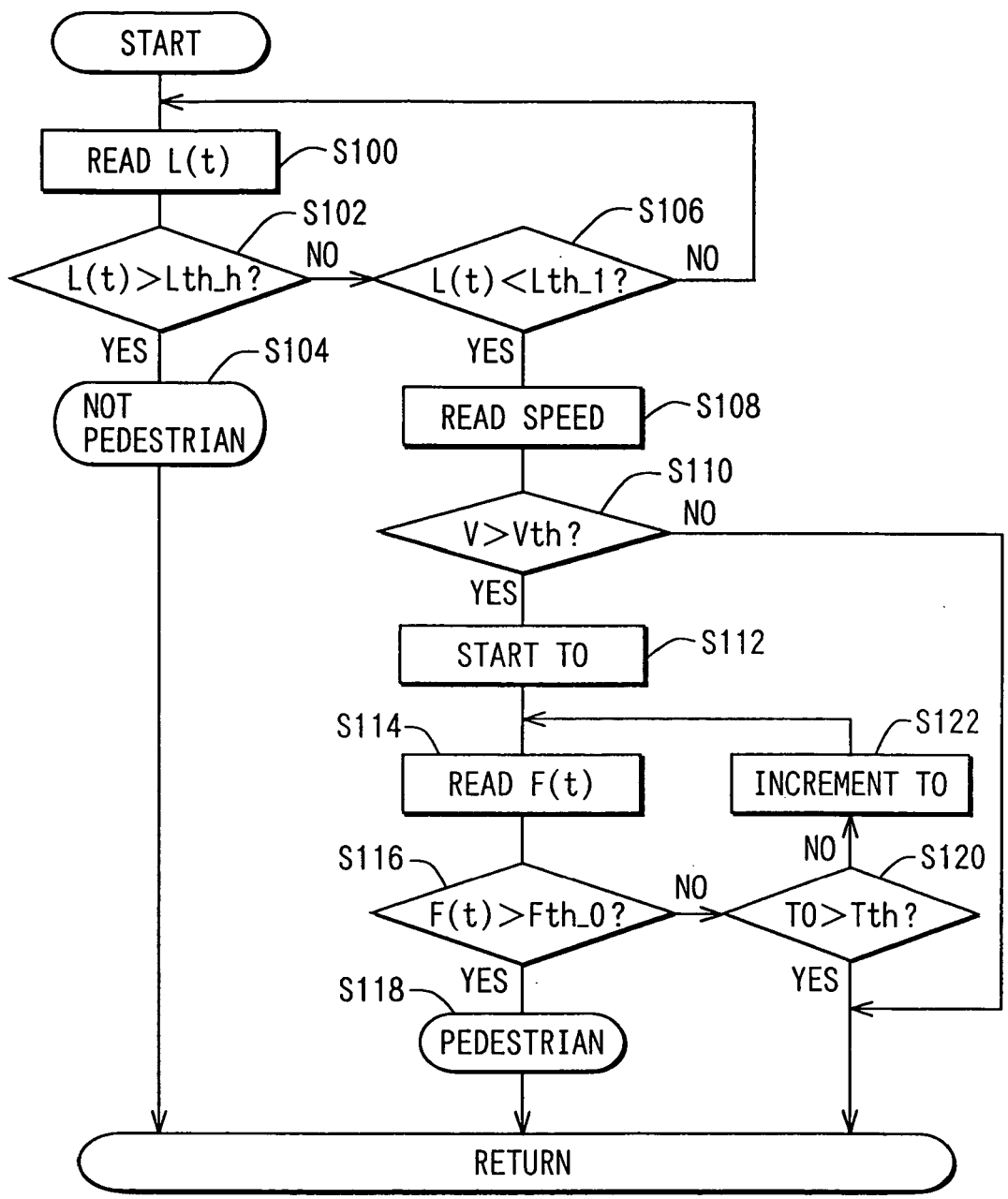
FIG. 6 is a flow chart diagram showing a pedestrian determining process according to the first embodiment.

Next, a pedestrian determining process by the micro-computer of the controller 4 will be explained with reference to FIG. 6.

At Step S100, an impedance signal L(t) corresponding to an output voltage Vo is read. At Step S102, it is determined whether the read impedance signal L(t) is a threshold value Lth_h or more. When the read impedance signal L(t) is determined to be a threshold value Lth_h or more, the collision object is determined to be an object other than a pedestrian at Step S104 since it is supposed that a metal member approaches.

When the read impedance signal L(t) is determined to be less than the threshold value Lth_h, it is determined whether the read impedance signal L(t) is a threshold value Lth_1 or less at Step S106. Here, the threshold value Lth_1 is less (or smaller) than the threshold value Lth_h. When the read impedance signal L(t) is determined to be more than the threshold value Lth_1, no pedestrian is determined to be approaching, which returns the process to Step S100.

When the read impedance signal L(t) is determined to be the threshold value Lth_1 or less, a pedestrian is determined to be approaching, which advances the process to Step S108. Here, a vehicle speed V is read. Next, it is determined whether the vehicle speed V is a given value Vth or more at Step S110. When the vehicle speed V is determined to be not the given value Vth nor more, it is determined that no harm is given to the pedestrian, returning the process to a main routine. When the vehicle speed V is determined to be the given value Vth or more, a timer T0 is started at Step S112 and then a collision load F(t) is read at Step S114. Next, it is determined whether the read collision load F(t) is a given threshold value Fth_0 or more at Step S116. When the read collision load F(t) is determined to be the given threshold value Fth_0 or more, it is determined that the collision object is a pedestrian at Step S118, which returns the process to the main routine. When the read collision load F(t) is determined to be not the given threshold value Fth_0 nor more, it is determined whether a count time of the timer T0 is a given threshold value Tth or more at Step S120. When the count time of the timer T0 is determined to be not the given threshold value Tth nor more, the timer T0 is then incremented at Step S122, which further returns the process to Step S114.

Thus, a collision with a pedestrian is detected by increasing of a collision load within a given period (Tth) starting from when the collision with the pedestrian is determined using the impedance sensor 1. Hence, the pedestrian protecting device is prevented from operating because of a collision with a metal member or insulating object. Further, even when a pedestrian approaches but does not collide with the vehicle, the pedestrian protecting device is prevented from operating. This exhibits a remarkable practical effect.

Modification

The above-described threshold values Lth_h, Lth_1 of the impedance sensor 1 can be constant. It is supposed that the output voltage Vo of the impedance sensor 1 has continued to be almost maintained at a certain value for a given period. In this case, the threshold value Lth_h of the impedance sensor 1 can be set at the certain value, while the threshold values Lth_1 of the impedance sensor 1 can be set as a value that is smaller, by a constant value, than the certain value. This solves an offset variation, which includes a time-series variation in a characteristic of the impedance sensor 1 or a level variation in the output voltage Vo when no collision object is present.

Figure 7:
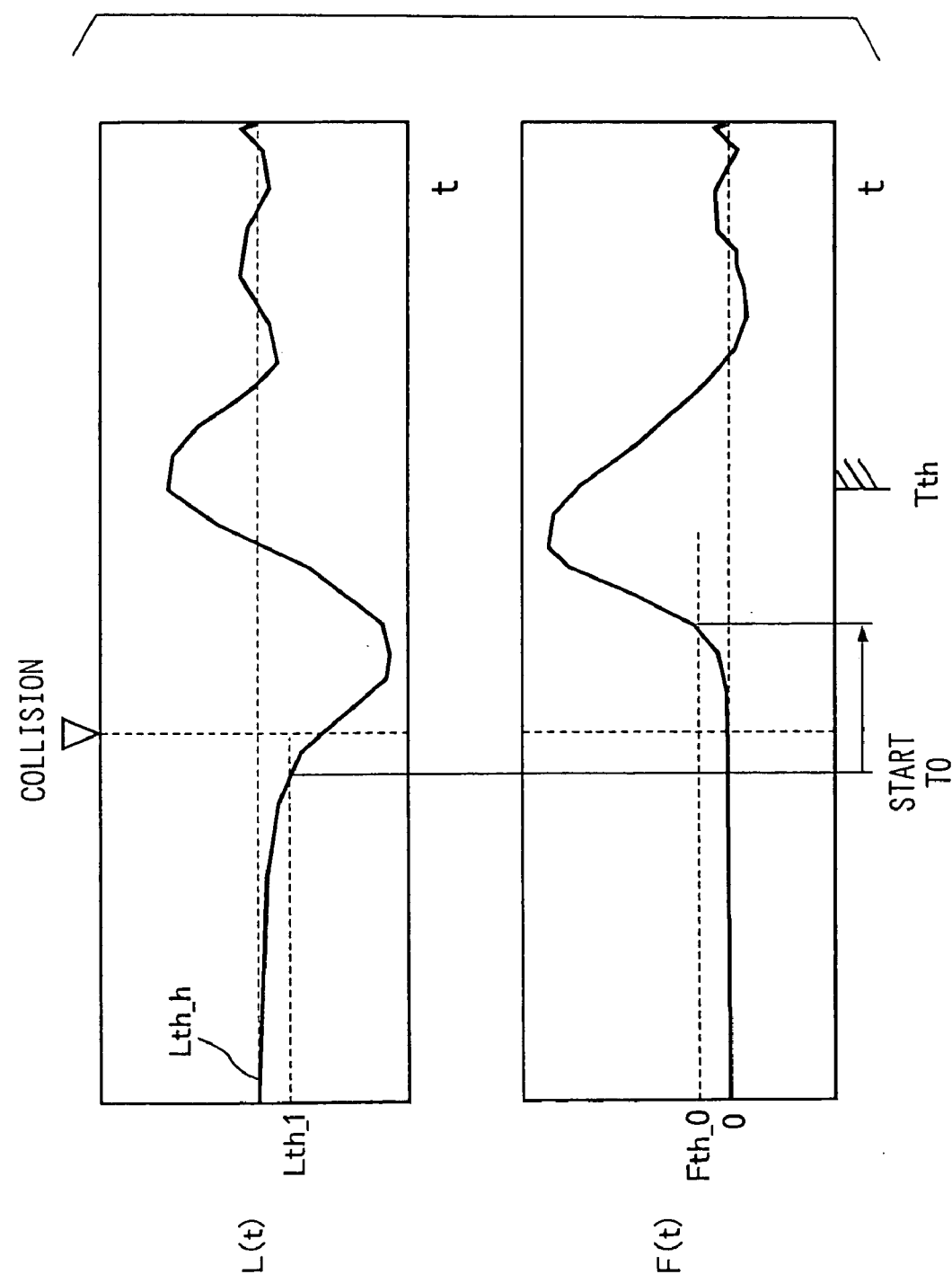
FIG. 7 is a graph showing waveforms of sensor outputs when a pedestrian collides in the first embodiment.

Output waveforms of the impedance sensor 1 and collision load sensor 2 are shown in FIG. 7.

Effect of the Embodiment

Effects of the embodiment will be summarized as follows:

(1) In a case where a collision load sensor is activated when an impedance sensor detects no pedestrian approaching, a pedestrian protecting device is not operated. For instance, in a case where a collision load sensor is activated when a heavy object falls on a vehicle (here, an impedance sensor that detects an object without contact is not activated), a pedestrian protecting device is not operated.

(2) In a case where a pedestrian does not result in colliding with a vehicle and a collision load sensor is not activated within a given period even when an impedance sensor detects the pedestrian approaching, a pedestrian protecting device is not operated. Without relying on an insecure pedestrian collision detection by an impedance sensor, a pedestrian protecting device can be prevented from operating even when no pedestrian collides.

(3) An impedance sensor can discriminate the following object. The object has a weight approximately equaling that of a pedestrian, so that the object is not easily discriminated from the pedestrian by a collision load sensor. By contrast, the object has a different impedance proper from that of the pedestrian.

(4) An impedance sensor enables pedestrian determining prior to an actual collision moment, so that a preparation for the collision can be possible. Further, for the collision, a secure determination in which an impedance sensor is inferior is completed by a collision load sensor.

(Second Embodiment)

Figure 8:
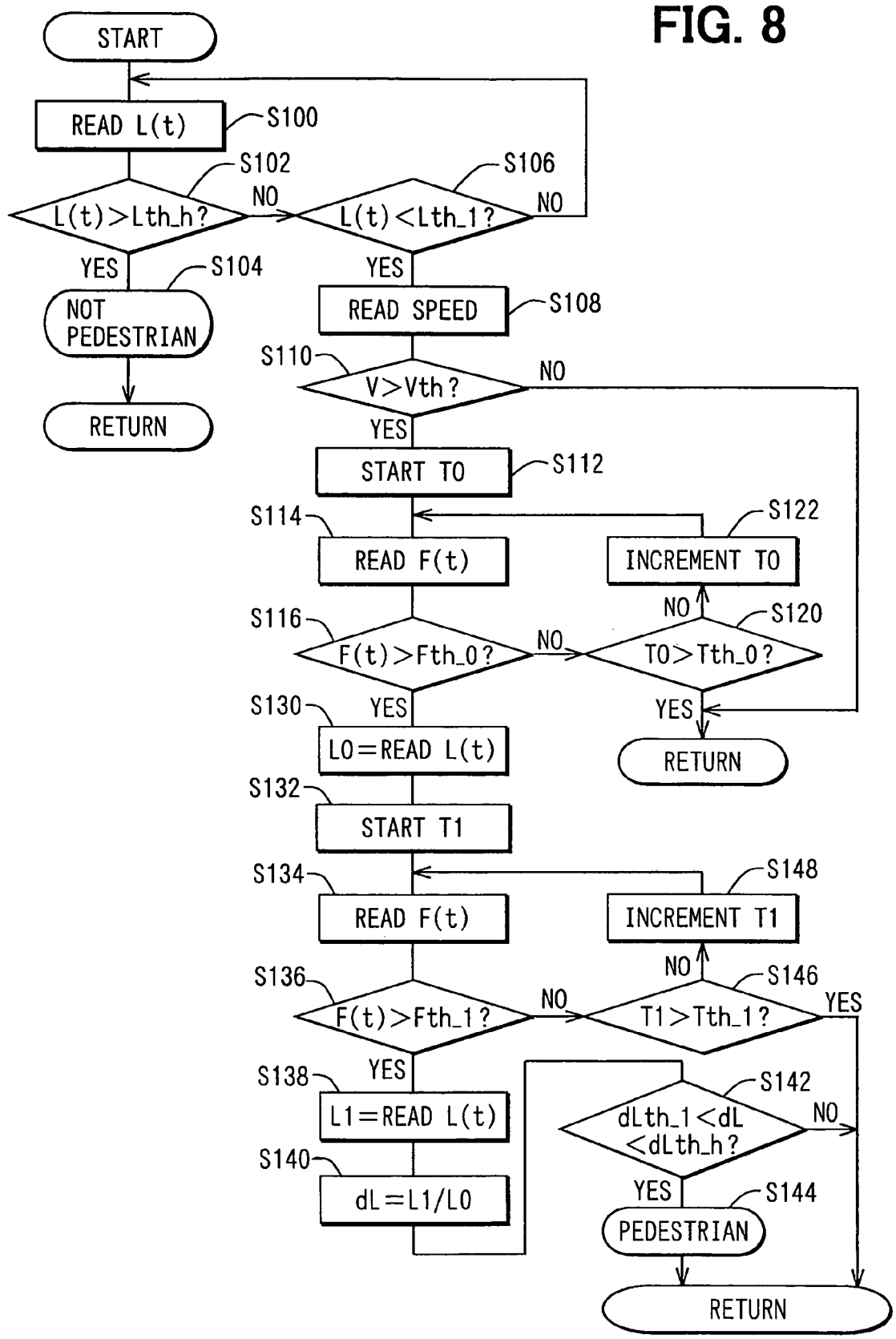
FIG. 8 is a flow chart diagram showing a pedestrian determining process according to a second embodiment.

A second embodiment will be explained with reference to FIG. 8. A pedestrian determining process in the second embodiment is modified from that in the first embodiment. A flowchart diagram includes Steps S130 to S148 basically in addition to Steps included in FIG. 6. Here, a threshold value Tth_0 at Step S120 in FIG. 8 corresponds to a threshold value Tth at Step S120 in FIG. 6.

At Step S116, when the read collision load F(t) is determined to be the given threshold value Fth_0 or more, an impedance signal L(t) at this moment is read and memorized as a collision-moment impedance value L0 at Step S130. A second timer T1 is then started at Step S132.

Next, a collision load F(t) is read at Step S134. It is then determined whether the collision load F(t) is a given threshold value Fth_1 or more at Step S136. When the collision load F(t) is determined to be the given threshold value Fth_1 or more, an impedance signal L(t) is read as a value L1 at Step S138. A change rate of the impedance signal L(t) is obtained by computing (dl=L1/L0) at Step S140. It is determined whether the change rate (dL) falls within a given region corresponding to a pedestrian (dLth_1<dL<dLth_h) at Step S142. When the change rate (dL) is determined to be falling within the given region, the collision object is determined to be a pedestrian at Step S144. By contrast, when the change rate (dL) is determined to be not falling within the given region, the collision object is determined to be an object other than a pedestrian, which returns the process to the main routine.

At Step S136, when the collision load F(t) is determined to be not the given threshold value Fth_1 nor more, it is determined whether a count time of the timer T1 reaches a given period Tth_1 that indicates a given period elapses from the collision moment, at Step S146. When the timer T1 is determined to be not reaching the given period Tth_1, the timer T1 is incremented at Step S148, which then returns the process to Step S134. When the count time of the timer T1 is determined to be reaching the given period Tth_1, it is determined that the collision object is not a pedestrian, which returns the process to the main routine.

Namely, in this embodiment, at first, a decrease of the impedance signal L(t) that corresponds to a pedestrian is detected by an output of the impedance sensor 1. It is then determined that the vehicle speed V is high enough. It is then determined that a collision that exhibits a given collision load or more occurs since the collision load F(t) exceeds the threshold value Fth_0 within a given period. An increasing ratio of the impedance signal L(t) is computed from the collision moment (starting point of the timer T1) to when the collision load F(t) reaches the given value Fth_1. It is then determined whether the computed increasing ratio of the impedance signal L(t) falls within the given region corresponding to a pedestrian. When this determination is affirmed, the collision object is determined to be a pedestrian.

Figure 9:
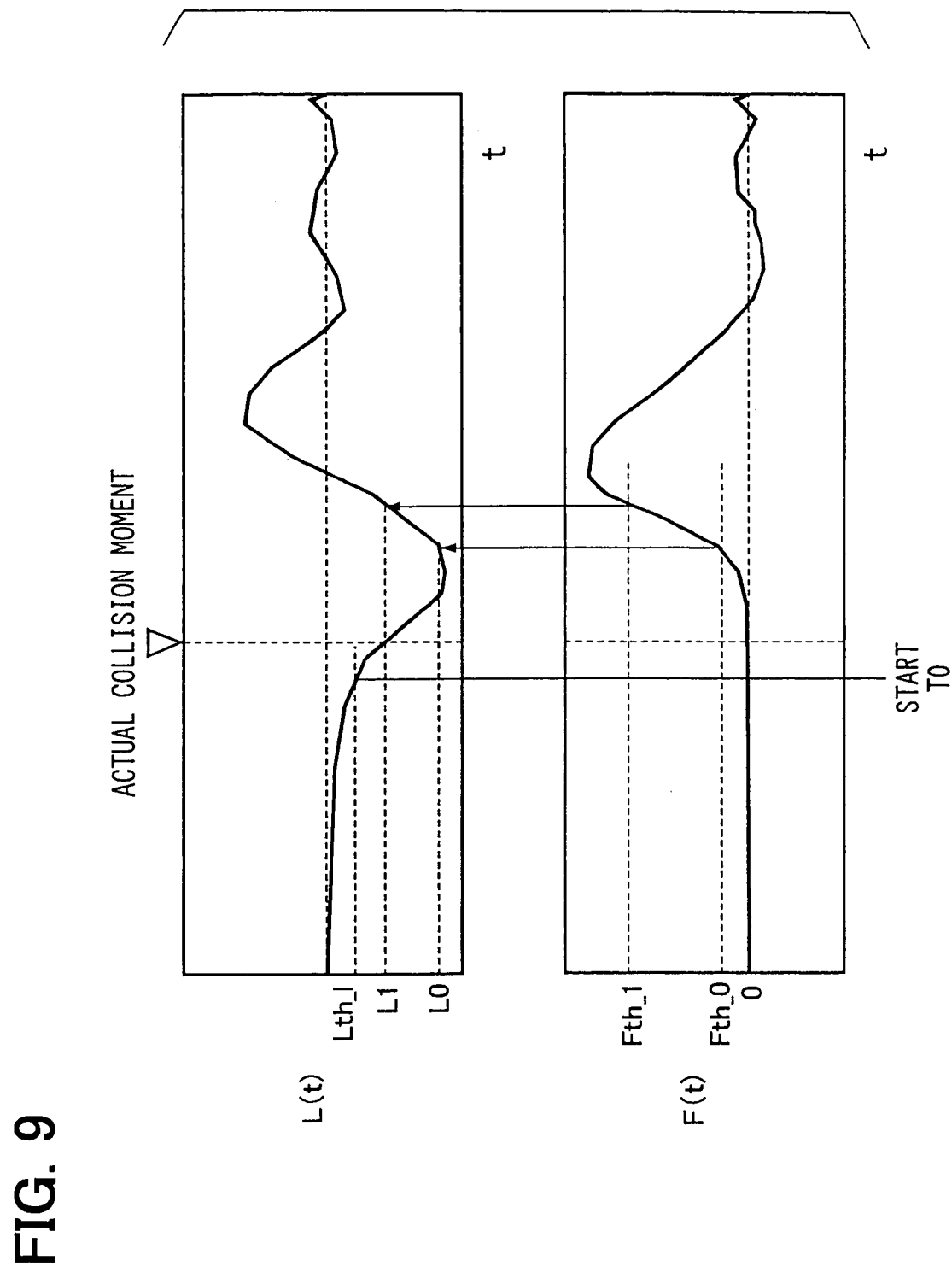
FIG. 9 is a graph showing waveforms of sensor outputs when a pedestrian collides in the second embodiment.

In this embodiment, threshold values and sensor output waveforms are shown in FIG. 9. A time point when the collision load sensor 2 detects a collision is when the collision load F(t) reaches the Fth_0. This time point is positioned, by a given period, after the actual collision moment. During this given period, the output of the impedance sensor 1 starts to increase. Namely, just after the actual collision moment, the impedance output decreases because of the pedestrian closely contacting with the coil L. The pedestrian then departs from the coil L because of the rebound, while the impedance sensor 1 attached on the bumper cover 13 is deformed in such a manner that the impedance sensor 1 departs from the pedestrian. The impedance output thereby increases. Here, the increasing ratio of the impedance sensor output is differentiated between a pedestrian and other objects that have different shapes and rigidity from the pedestrian. In this embodiment, this difference is utilized for enhancing accuracy in determining the pedestrian.

Modification

In this embodiment, the pedestrian determination is substantially performed by whether the impedance signal difference between L0 and L1 falls within the region corresponding to the pedestrian. Here, L0 is a value of the impedance signal L(t) when the collision is detected (the collision load F(t) reaches Fth_0), while L1 is a value of the impedance signal L(t) when the collision load F(t) increases to Fth_1. However, the pedestrian determining can be performed by whether L0 or an average of L0 and L1 falls within the region corresponding to a pedestrian. Namely, since a relationship in a forward-rearward direction of the vehicle between the pedestrian and the coil L is fixed at the collision moment, a variation in the impedance signal L(t) can be decreased.

Further, a body type of the pedestrian or a superficial dimension observed by the coil L or capacitor C2 is assumed based on L0 of the impedance signal L(t) at the collision moment.

Further, differentiating between a pedestrian and a person riding on a bicycle can be performed based on, of a collision object, a mass that is obtained from the peaked value or waveform of the collision load F(t) and L0 of the impedance signal L(t) at the collision moment. Here, variations in the waveform derived from vehicle speeds should be compensated previously.

In a conventional method, the pedestrian determining is performed by using only one of the collision load F(t) and the impedance signal L(t). In this embodiment, the pedestrian determining is performed by using both the collision load F(t) and the impedance signal L(t). For instance, both a collision load F(t) and an impedance signal L(t) are substituted to a given function that includes the collision load F(t) and the impedance signal L(t) as input variables. For instance, both the collision load F(t) and the impedance signal L(t) are obtained from a map. Hence, this embodiment can enhance accuracy in the pedestrian determining in comparison with the conventional method. Further, this embodiment can enhance the accuracy in comparison with the following case. A first pedestrian determining using the collision load F(t) and a second pedestrian determining using the impedance signal L(t) are separately performed. A final pedestrian determining is then completed by a logical sum or logical multiplication of the first pedestrian determining and the second pedestrian determining.

(Third Embodiment)

Figure 10:
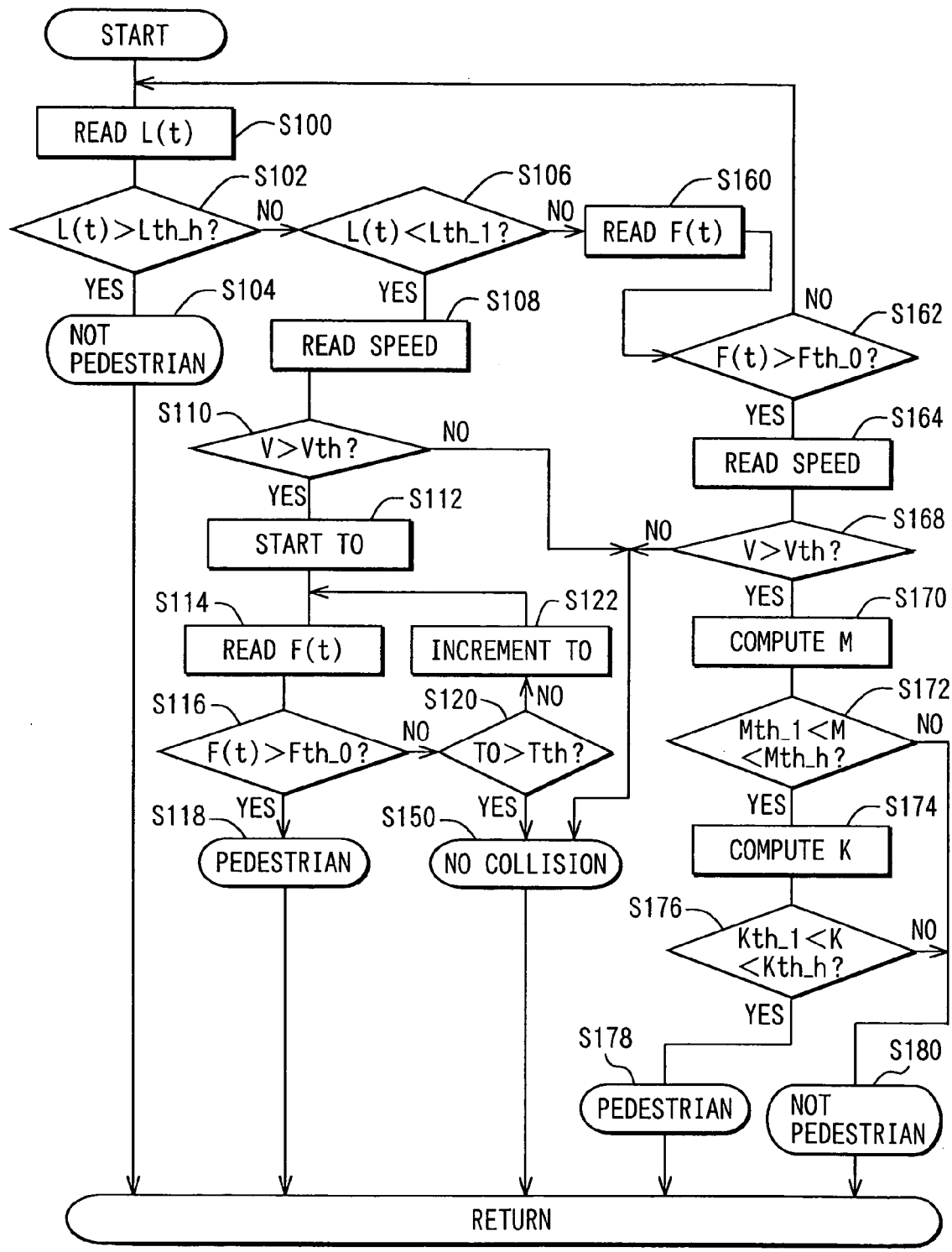
FIG. 10 is a flow chart diagram showing a pedestrian determining process according to a third embodiment.

A third embodiment will be explained with reference to FIG. 10. This embodiment is a modification of the first embodiment. A flowchart in FIG. 10 includes Steps S150 to S180 in addition to the flowchart in FIG. 6. However, when the count time of the timer T0 exceeds the threshold value Tth_0 at Step S120, no collision occurrence is determined, which returns the process to the main routine.

When the impedance signal L(t) is determined to be the lower threshold value Lth_1 or less at Step S106, a collision load F(t) is read at Step S160. It is determined whether the read collision load F(t) is the threshold value Fth_0 or more at Step S162. When the read collision load F(t) is determined to be less than the threshold value Fth_0, the process returns to Step S100. When the read collision load F(t) is determined to be the threshold value Fth_0 or more, a wheel speed V as the vehicle speed is read at Step S164. It is determined whether the wheel speed V is the given threshold value Vth or more at Step S168. When the wheel speed V is determined to be not the given threshold value Vth nor more, no collision occurrence is determined at Step S150, which returns the process to the main routine. When the wheel speed V is determined to be the given threshold value Vth or more, a mass M of the collision object is computed at Step S170. It is determined whether the computed mass M falls within a region corresponding to a pedestrian (Mth_1<M<Mth_h) at Step S172. When the mass M falls outside the given region, the collision object is determined to be an object other than a pedestrian at Step S180, which returns the process to the main routine. When the mass M falls within the given region, rigidity K of the collision object is computed at Step S174. It is determined whether the computed rigidity K falls within a region corresponding to a pedestrian (Kth_1<K<Kth_h) at Step S176. When the rigidity K falls outside the given region, the collision object is determined to be an object other than a pedestrian at Step S180, which returns the process to the main routine. When the rigidity K falls within the given region, the collision object is determined to be a pedestrian at Step S178, which returns the process to the main routine. When the collision object is determined to be a pedestrian after the collision occurrence, the pedestrian protecting device 8 is activated by a subroutine (not shown) of the main routine.

Namely, this embodiment addresses a case where the impedance decrease of the impedance sensor 1 is not present, or when electrostatic capacitance increase not accompanied by an increase in inductance and eddy current is not present (NO at Step S106). In this case, further when a collision is detected at Step S162 by increasing of the collision load F(t) and the vehicle speed V is determined to be high at Step S168, a mass and rigidity of the collision object are computed. When the computed mass and rigidity are determined to be falling within those of the pedestrian, the pedestrian protecting device 8 is activated.

Thus, even when in any reason the decrease of the impedance is small, both the mass and rigidity can determine the pedestrian, which enhances accuracy in determining. For instance, when metal (e.g., rivet) is attached to a trouser of a pedestrian, or a pedestrian is riding a bicycle, the decrease of the impedance and the floating electrostatic capacitance increase simultaneously occur in the LCR circuit 11. Therefore, the decrease in the impedance signal L(t) may not be detected. Here, it is unlikely that an object other than a pedestrian has the same mass and rigidity as those of the pedestrian. When a collision occurs without the impedance decrease, the mass and the rigidity can be thereby used for the pedestrian determining and preventing the pedestrian protecting device from mis-operating. Namely, this modification can address a case where a pedestrian collides without the impedance signal L(t) being not decreased in any reason. Further, the pedestrian determining at Steps S170 to S178 can be inserted between Steps S116 to S118.

The above-described computing method for the mass and rigidity of the collision object will be explained below. A collision load F(t) is read. When the read collision load F(t) exceeds a threshold value Fth_0, an internal timer T1 is reset. A collision load F(t) is read again, and the timer T1 is incremented up to a time Tx for which the collision load F(t) exceeds the threshold value Fth_1 (larger than Fth_0). When the collision load F(t) reaches the threshold value Fth_1, rigidities of the collision object and the bumper are obtained based on a relationship between time Tx and K that are previously memorized. The relationship is previously obtained from experiments and a converting table can be memorized in the controller 4. This rigidity K is a function value having negative correlation with a necessary period for which the collision load increases from a given low value up to a given high value. In qualitatively explaining it, large rigidity indicates that a collision portion between the collision object and the vehicle body is rigid, so that the collision load F(t) increases in short time. By contrast, the small rigidity indicates that a collision portion between the collision object and the vehicle body is not rigid, so that the collision load F(t) increases in much time. Namely, the rigidity K is a parameter that exhibits a tendency of deformation with difficulty.

When the collision load F(t) reaches the threshold value Fth_1 in a time Ty, a mass M of the collision object is obtained based on a relationship between the time Ty and the collision object mass M that are previously memorized. The relationship is previously obtained from experiments and a converting table can be memorized in the controller 4. Further, at the collision occurrence, after the collision object is strongly pushed on the vehicle body, the collision load F(t) is then decreased because of the rebound by the elasticity of the collision object or the bumper. The time for which the collision object is being pushed on the vehicle body is short when the mass of the collision object is small. By contrast, the time for which the collision object is being pushed on the vehicle body is long when the mass of the collision object is large. Therefore, the mass M of the collision object can be computed from the time Ty.

(Others)

A frequency of the impedance sensor 1 can be set as needed. Increasing the frequency up to a certain level increases sensitivity.

In the above embodiments, the coil L that discriminates a pedestrian from a metal member based on inductance decrease or resistance decrease due to eddy current, and the capacitor C2 that discriminates a pedestrian from an insulating member based on increase in a floating electrostatic capacitance are integrated into the same circuit. However, it is very clear that the both can be separately used.

In this case, when a human body or insulating member approaches the coil L, the impedance of the coil L hardly changes. By contrast, there is a collision object that produces an impedance (inductance) increase of the coil L because of its large magnetic permeability, the impedance increase which outdoes an impedance decrease of the coil L because of the eddy current. For instance, this collision object includes a thin metal plate or high-resistance magnetic member disposed in the same direction as that of the magnetic field. Here, since the inductance of the coil L increases, this collision object can be easily discriminated from a human body that generates no increase in the inductance of the coil L. Namely, the impedance sensor that detects impedance of the coil L and the impedance sensor that detects floating electrostatic capacitance can be separately used.

As shown in FIG. 5A, the multiple coils L (accompanied by the respective capacitors C2) are serially disposed in a vehicle-width direction in front of the bumper, so that a collision portion in the vehicle-width direction can be determined based on the output from the corresponding coil L. Hence, according to the resulting position in the vehicle-width direction, the corresponding pedestrian protecting device (e.g., hood airbag or pillar airbag) can be activated. It is supposed that a pedestrian protecting device is activated without considering the position. In this case, the entire pedestrian protecting devices can be activated when at least one of the coils L or the capacitances C2 determines the pedestrian.

Further, the output of the collision load sensor 1 is varied by a transmission route of a collision force to the vehicle body, so that the outputs or the threshold values of the collision load sensor 2 can be adjusted based on the resulting position obtained from the output of the impedance sensor 1. Variations of the collision load due to variations of the collision position is thereby compensated.

When a pedestrian forward of the vehicle is detected, it is preferable that, of the capacitor C2, the electrode plate that is located in the vehicle is wide as much as possible and disposed approximately perpendicular to a forward-rearward direction of the vehicle. Therefore, attaching or embedding a thin metal plate or net-formed metal lines forming the electrode plate in the bumper cover is preferable. Here, the electrode plate is necessary for being isolated from the vehicle body. Further, a bumper absorber can be used as the electrode plate. Here, it is favorable that the coil L is grounded to the bumper and opens forward. When the electrode plate of the capacitance C2 covers the front and rear opening of the coil L, this electrode plate generates eddy current to decrease sensitivity in the coil L. It is thereby preferable that the opening of the coil L be not covered by the electrode plate.

Further, when the vehicle speed V is determined to be a certain speed (e.g., 100 k/m) or more, the controller 4 can control the pedestrian protecting device 8 for being not activated. Under such a high speed condition, the effect of protecting a pedestrian by the pedestrian protecting device 8 cannot be expected; further, the protecting device itself may be damaged and break a windshield to thereby harm an occupant of the vehicle.

It will be obvious to those skilled in the art that various changes may be made in the above-described embodiments of the present invention. However, the scope of the present invention should be determined by the following claims.

What is claimed is:

1. A pedestrian determining system that is mounted on a vehicle and determines a collision object for protecting a pedestrian, the pedestrian determining system comprising:
    an impedance sensor that detects one of an alternating-current impedance and an electricity quantity being a function value of the alternating-current impedance to thereby output the detected one as an impedance signal, wherein the alternating-current impedance is varied by approaching of the collision object:
    a collision load sensor that detects a collision load when the collision object collides with the vehicle to output the detected collision load as a collision load signal; and
    a controller that determines whether the collision object is the pedestrian or not at least based on a value of a given function including as input variables the impedance signal outputted from the impedance sensor and the collision load signal outputted from the collision load sensor.

2. The pedestrian determining system of claim 1, wherein the controller determines whether the collision object is the pedestrian, with reference to a signal value of the impedance signal at a collision detection moment at which the collision load sensor detects a collision, based on a variation in the impedance signal before the collision detection moment or after the collision detection moment.

3. The pedestrian determining system of claim 1, wherein, at least when the collision load sensor detects a collision load that is not less than a given load value within a given period starting from when the impedance signal crosses a given signal value in a direction in which the collision object approaches the vehicle, the controller determines that the collision object is the pedestrian and controls a pedestrian protecting device for being activated, and
    wherein, at least when the collision load sensor does not detect the collision load that is not less than the given load value within the given period, the controller determines that the collision object is not the pedestrian and controls the pedestrian protecting device for being not activated.

4. The pedestrian determining system of claim 3, wherein the controller determines whether the collision object is the pedestrian based on variations in waveforms of the both the impedance sensor and the collision load sensor within the given period.

5. The pedestrian determining system of claim 4, wherein the controller determines that the collision object is the pedestrian when an amount of a variation in the impedance signal over a certain period taking place to when the collision load varies to a certain load value from when the impedance signal crosses the given signal value in the direction in which the collision object approaches the vehicle falls within a given region.

6. The pedestrian determining system of claim 1, wherein the controller computes a mass of the collision object and a rigidity of the collision object based on the detected collision load and a vehicle speed, and
    wherein, when the computed mass and the computed rigidity fall within regions corresponding to the pedestrian, the controller determines that the collision object is the pedestrian and controls a pedestrian protecting device for being activated.

7. The pedestrian determining system of claim 1, further comprising:
    a vehicle speed sensor that detects one of a vehicle speed and a wheel speed,
    wherein the controller controls a pedestrian protecting device for being not activated when the detected one is not more than a given speed value.

8. The pedestrian determining system of claim 1, further comprising:
    a vehicle speed sensor that detects one of a vehicle speed and a wheel speed,
    wherein the controller controls a pedestrian protecting device for being not activated when the detected one is not less than a certain speed value.

9. The pedestrian determining system of claim 1, wherein the impedance sensor includes:
    a coil; and
    an electrode of a capacitor, wherein electrostatic capacitance of the capacitor is varied by a floating electrostatic capacitance between an end of the coil and a ground, and
    wherein the impedance sensor outputs an electricity quantity relating to an electric potential of the electrode as the impedance signal.

10. The pedestrian determining system of claims 1, wherein the impedance sensor includes:
    a coil of which an end is electrically connected with a high-frequency power for giving a high-frequency magnetic field to the collision object, and
    wherein the impedance sensor outputs an electricity quantity relating to a voltage drop of the coil as the impedance signal.

11. The pedestrian determining system of claim 1, wherein the impedance sensor includes:
    a coil of which a first end is electrically connected with a high-frequency power for giving a high-frequency magnetic field to the collision object; and
    an electrode of a capacitor, wherein the electrode is electrically connected via a connecting portion with the coil, wherein electrostatic capacitance of the capacitor is varied by a floating electrostatic capacitance between a second end of the coil and a ground, and
    wherein the impedance sensor outputs a variation in an electrical potential at the connecting portion as the impedance signal.

12. The pedestrian determining system of claim 1, wherein the impedance sensor includes a plurality of coils that are serially disposed in a vehicle-width direction in a bumper of the vehicle,
    wherein the coils are accompanied by respective electrostatic capacitances with a ground, and
    wherein, when a certain coil accompanies a maximum electrostatic capacitance among the electrostatic capacitances of the coils, an electricity quantity corresponding to the maximum electrostatic capacitance is used as the impedance signal of the impedance sensor.

13. The pedestrian determining system of claim 1, wherein the impedance sensor includes a plurality of impedance circuit units,
wherein each of the impedance circuit units includes:
  a coil; and
  an electrode of a capacitor, wherein the electrode is electrically connected via a connecting portion with the coil, wherein electrostatic capacitance of the capacitor is varied by a floating electrostatic capacitance between an end of the coil and a ground,
wherein the coils of the plurality of the impedance circuit units are serially disposed in a vehicle-width direction in a bumper of the vehicle, and
wherein, when a certain impedance circuit unit has, at the connecting portion, a minimum electric potential among the electric potentials at the connecting portions of the plurality of the impedance circuit units, the minimum electric potential of the certain impedance circuit unit is used as the impedance signal of the impedance sensor.

14. The pedestrian determining system of claim 13, wherein an axis of the coil is disposed parallel with a direction in which the collision object is supposed to be approaching the vehicle.

15. The pedestrian determining system of claim 1, wherein
  the impedance sensor continues to output the impedance signal after the collision object collides with the vehicle, and
  (i) the impedance signal as the input variable is outputted from the impedance sensor after the collision object collides with the vehicle, and
  (ii) the collision load signal as the input variable outputted from the collision load sensor after the collision object collides with the vehicle.

16. The pedestrian determining system of claim 15, wherein
  the collision load sensor continues to output the collision load signal, which varies without fluctuating for a given period starting from when the collision object collides with the vehicle, and
  (i) the impedance signal as the input variable is outputted within the given period from the impedance sensor, and
  (ii) the collision load signal as the input signal is outputted within the given period from the collision load sensor.

* * * * *